(12) United States Patent
Yamada et al.

(10) Patent No.: US 8,358,854 B2
(45) Date of Patent: Jan. 22, 2013

(54) SEARCH SKIP REGION SETTING FUNCTION GENERATION METHOD, SEARCH SKIP REGION SETTING METHOD, AND OBJECT SEARCH METHOD

(75) Inventors: Miki Yamada, Ome (JP); Yoshihiro Ohmori, Ome (JP); Kaoru Matsuoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 13/166,701

(22) Filed: Jun. 22, 2011

(65) Prior Publication Data
US 2012/0114252 A1  May 10, 2012

(30) Foreign Application Priority Data
Nov. 5, 2010  (JP) ................. 2010-248557

(51) Int. Cl.
 *G06K 9/00* (2006.01)
(52) U.S. Cl. ....................... 382/209; 382/201
(58) Field of Classification Search .............. 382/201, 382/209
See application file for complete search history.

(56) References Cited

U.S. PATENT DOCUMENTS

| | | | | |
|---|---|---|---|---|
| 5,901,246 A | * | 5/1999 | Hoffberg et al. | 382/209 |
| 2007/0276541 A1 | * | 11/2007 | Sawasaki | 700/253 |

FOREIGN PATENT DOCUMENTS

| | | |
|---|---|---|
| JP | 09-54827 | 2/1997 |
| JP | 2000-76444 | 3/2000 |
| JP | 2003-022442 | 1/2003 |
| JP | 2007-094689 | 4/2007 |
| JP | 2008-065458 | 3/2008 |

OTHER PUBLICATIONS

Japanese Patent Application No. 2010-248557; Notice of Reasons for Rejection; Mailed Sep. 13, 2011 (English translation).
Yoshihiro Ohmori, "Regular Feature Detection Function for Fast Identification of Regularly Broadcast Segments in TV Programs," Toshiba Review, Toshiba Corporation, Oct. 1, 2009, vol. 64, No. 10, pp. 33-36.

* cited by examiner

*Primary Examiner* — Vikkram Bali
(74) *Attorney, Agent, or Firm* — Blakely, Sokoloff, Taylor & Zafman LLP

(57) ABSTRACT

According to one embodiment, a search skip region setting function generation method includes associating, detecting, and generating. The associating associates a template used to search a model image for an object with a designated search point on the model image, and detects a designated search point similarity between the designated search point and the template. When the designated search point similarity exceeds an object detection determination threshold, the detecting detects surrounding search point similarities between a plurality of surrounding search points around the designated search point on the model image and the template. The generating generates a function required to set a search skip region of the object based on relative positions between the object and the template, which are estimated based on a distribution of the surrounding search point similarities.

10 Claims, 10 Drawing Sheets

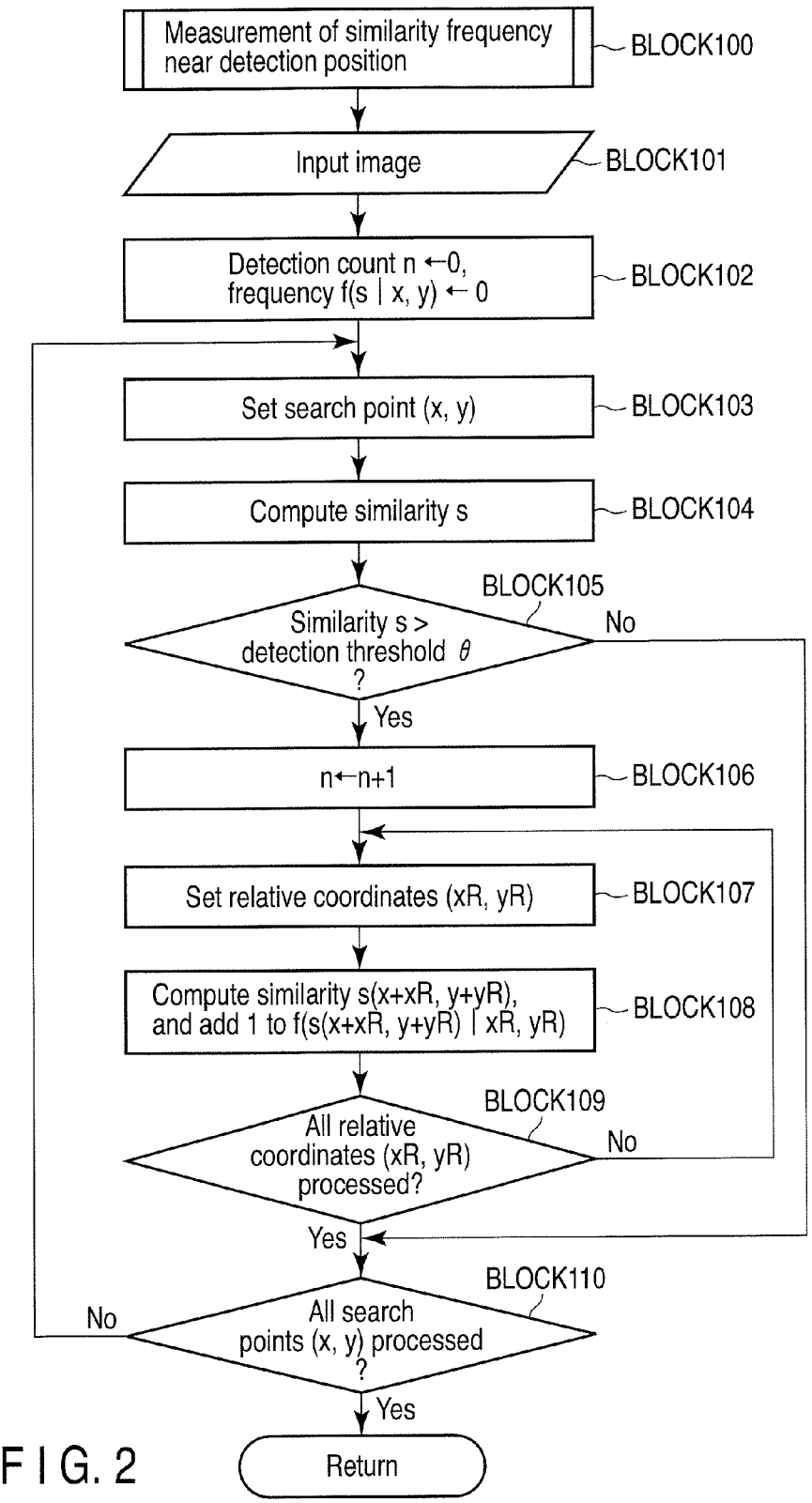
F I G. 2

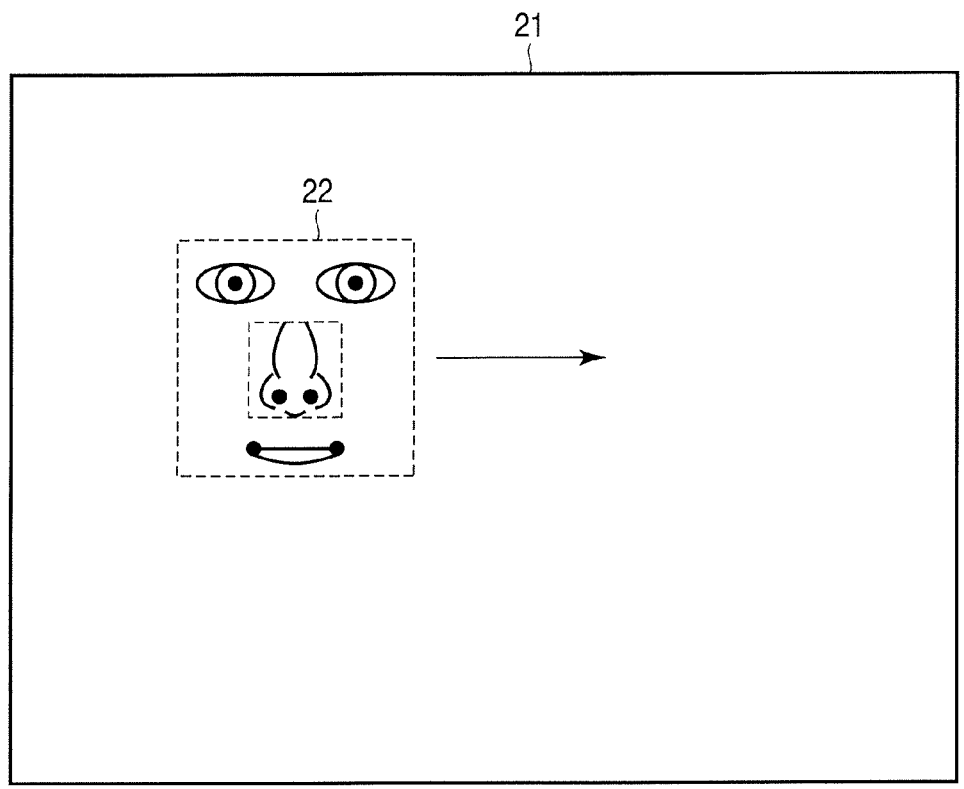
F I G. 7
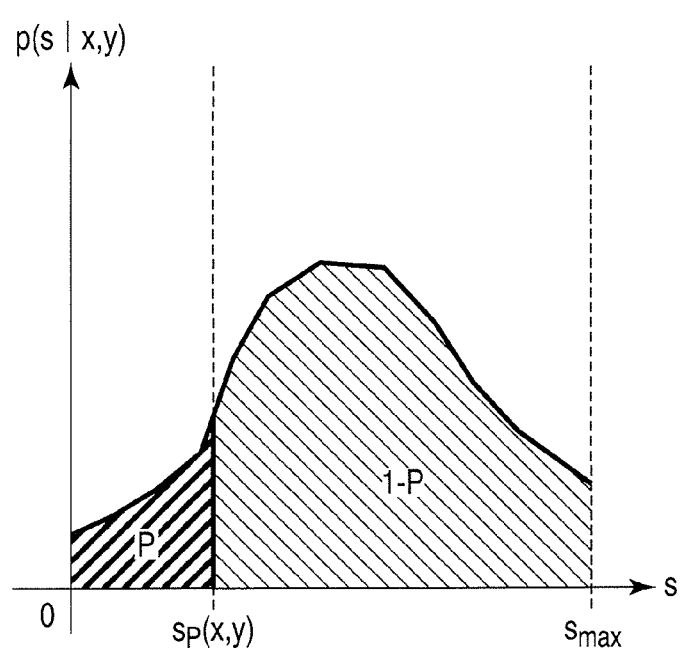
F I G. 8

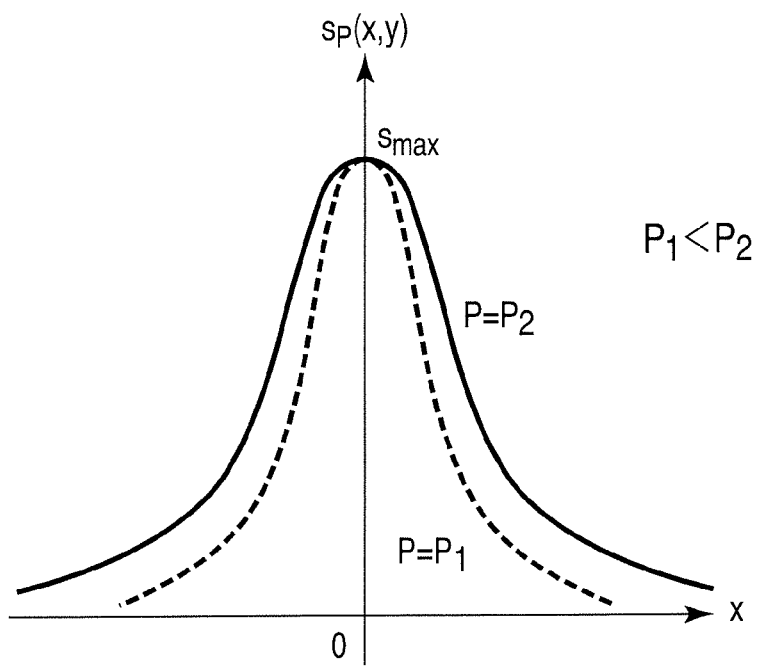
F I G. 11
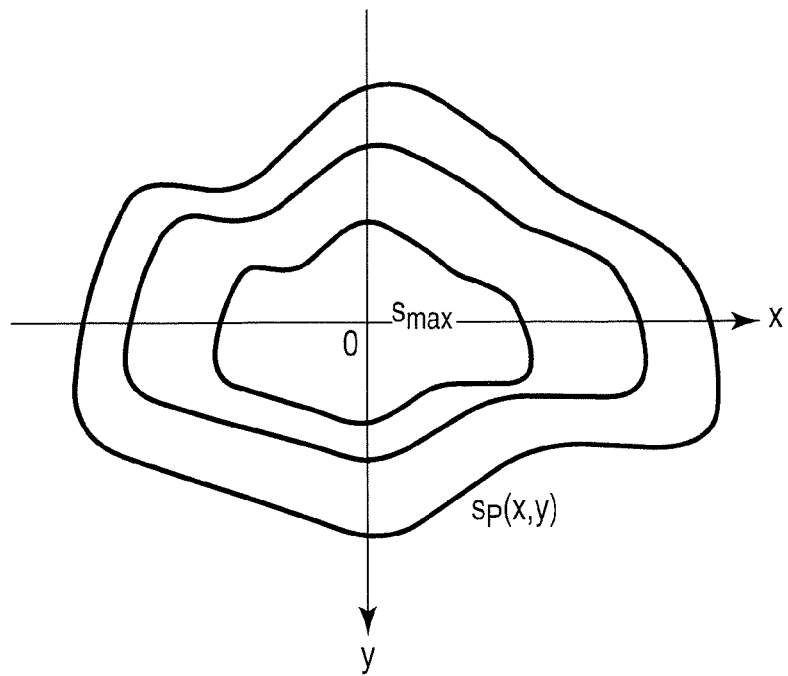
F I G. 12

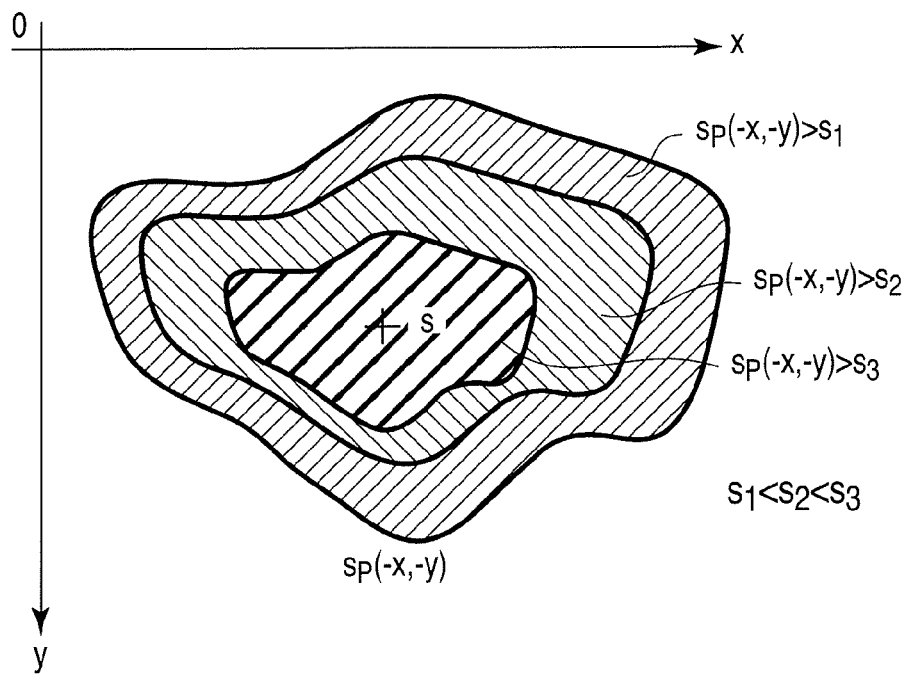
F I G. 13
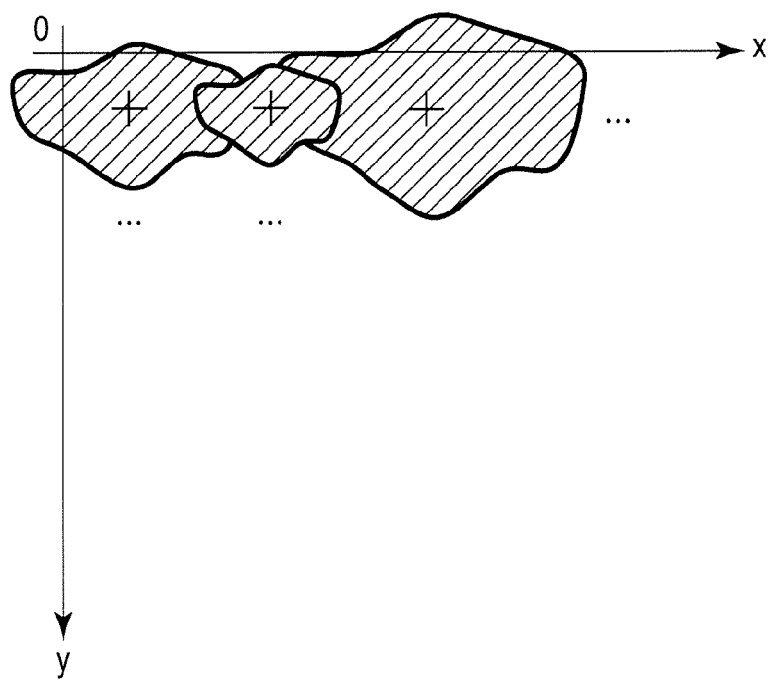
F I G. 14

SEARCH SKIP REGION SETTING FUNCTION GENERATION METHOD, SEARCH SKIP REGION SETTING METHOD, AND OBJECT SEARCH METHOD

CROSS-REFERENCE TO RELATED APPLICATIONS

This application is based upon and claims the benefit of priority from Japanese Patent Application No. 2010-248557, filed Nov. 5, 2010; the entire contents of which are incorporated herein by reference.

FIELD

Embodiments described herein relate generally to a search skip region setting function generation method, a search skip region setting method, and an object search method.

BACKGROUND

In recent years, various techniques for detecting an object such as a human face from an image have been proposed. For example, the following object detection technique has been proposed. A template created from a reference image is overlaid on an object search target image, and is scanned. At respective overlaying positions, distances (or similar values or similarities) between the object search target image and template (or between feature amounts of the object search target image and those of the template) are computed. Subsequently, an overlaying position where a minimum distance is obtained (or an overlaying position where a maximum similarity between the object search target image and template is obtained) is output as an object detection position.

In order to accurately search for an object, for example, a template is shifted pixel by pixel with respect to an object search target image, and a similarity between the object search target image and template is computed in correspondence with each shift position.

However, with the above object search method, the computation load for an object search is heavy, resulting in high computing cost. That is, an object search load is heavy. Hence, an efficiency enhancement technique of an object search is demanded.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a flowchart showing an example of measurement processing of a similarity frequency near a detection position in FIG. 1;

FIG. 7 is a view showing an example of the concept of object (face) detection according to the embodiment;

FIG. 8 is a graph showing an example of the concept of a similarity distribution (density) p(s|x, y) at relative coordinates (x, y) according to the embodiment;

FIG. 11 is a graph showing an example of the concept of a search skip region setting function sP(x, y) according to the embodiment;

FIG. 12 is a graph showing an example of the concept of a search skip region setting function sP(x, y) according to the embodiment;

FIG. 13 is a graph showing an example of the relationship between the search skip region setting function sP(x, y) and search skip regions according to the embodiment;

FIG. 14 is a graph showing an example of the relationship between search points and search skip regions according to the embodiment;

DETAILED DESCRIPTION

Various embodiments will be described hereinafter with reference to the accompanying drawings.

In general, according to one embodiment, a search skip region setting function generation method includes associating, detecting, and generating. The associating associates a template used to search a model image for an object with a designated search point on the model image, and detects a designated search point similarity between the designated search point and the template. When the designated search point similarity exceeds an object detection determination threshold, the detecting detects surrounding search point similarities between a plurality of surrounding search points around the designated search point on the model image and the template. The generating generates a function required to set a search skip region of the object based on relative positions between the object and the template, which are estimated based on a distribution of the surrounding search point similarities.

An object search skip region setting method of this embodiment detects, for example, a similarity distribution near an object using a learning image (model image) in advance before an object search, creates a search skip region setting function based on the similarity distribution, and sets a search skip region based on the search skip region setting function. An object search method of this embodiment sets a search skip region on an object search target image based on the search skip region setting function, and searches the object search target image for an object using a template by excluding the search skip region.

Figure 5:
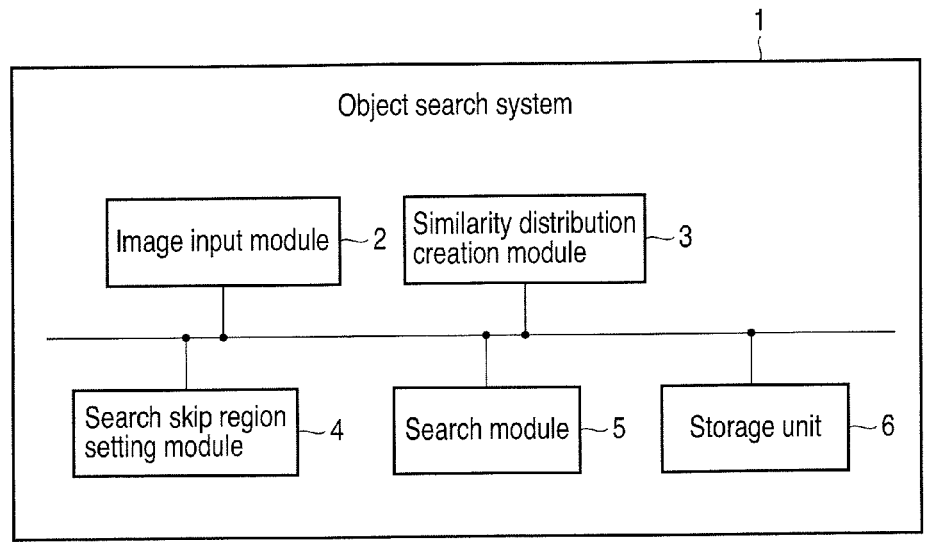
FIG. 5 is a block diagram showing an example of an object search system according to the embodiment.

For example, an object search system 1 shown in FIG. 5 creates a search skip region setting function, sets a search skip region on an object search target image based on the search skip region setting function, and searches the object search target image for an object using a template by excluding the search skip region.

All of the creation processing of a search skip region setting function, the setting processing of a search skip region, and the object search need not be implemented by a single device. For example, a computer creates a search skip region setting function. An image processing device such as a digital TV mounts an object search function based on the search skip region setting function, and searches for an object by the object search function. That is, the image processing device sets a search skip region on an object search target image (for example, a program image) based on the search skip region setting function created by, for example, the computer, and searches the object search target image for an object using a template by excluding the search skip region.

An example of the creation processing of a search skip region setting function, the setting processing of a search skip region, and the object search by the object search system 1 shown in FIG. 5 will be described below. As shown in FIG. 5, for example, the object search system 1 includes an image input module 2, a similarity distribution creation module 3, a search skip region setting module 4, a search module 5, and a storage unit 6.

Figure 1:
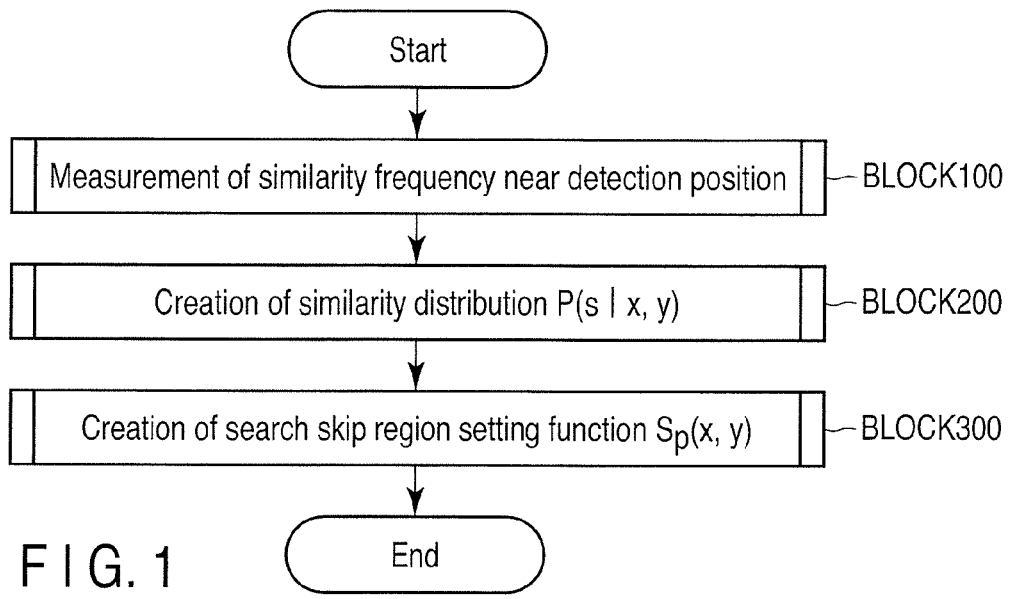
FIG. 1 is a flowchart showing an example of creation processing of a search skip region setting function according to an embodiment.

FIG. 1 is a flowchart showing an example of creation processing of a search skip region setting function.

Initially, an example of measurement processing of a similarity frequency near a detection position (BLOCK 100) in FIG. 1 will be described with reference to the flowchart shown in FIG. 2.

For example, the image input module 2 of the object search system 1 inputs a first learning image of, for example, a plurality of learning images (model images) (BLOCK 101). The similarity distribution creation module 3 initializes a detection count n and frequency $f(s|x, y)$ (BLOCK 102), sets a search point $(x, y)$ (BLOCK 103), and computes a similarity s at the search point (BLOCK 104).

Figure 6:
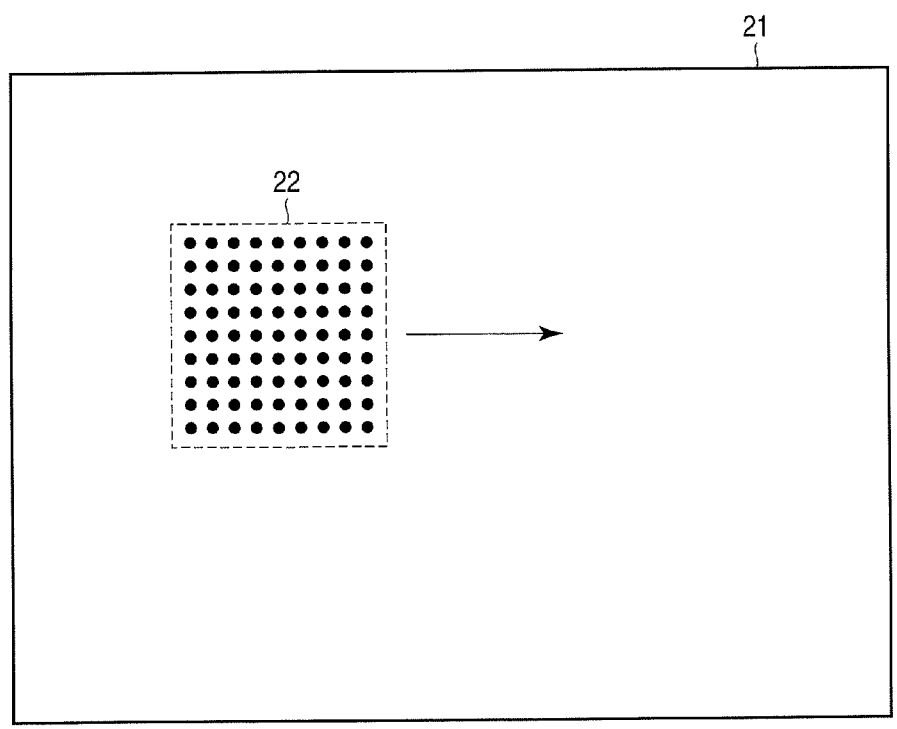
FIG. 6 is a view showing an example of the concept of an object search according to the embodiment.

That is, the similarity distribution creation module 3 scans a template 22 used to search a first learning image 21 (see FIGS. 6 and 7) for an object with respect to the first learning image 21. For example, the similarity distribution creation module 3 associates the template 22 (see FIGS. 6 and 7) used to search the first learning image 21 (see FIGS. 6 and 7) for an object with a first designated search point on the first learning image 21 to have a first positional relationship, and detects a first designated search point similarity (similarity s) between the first designated search point on the first learning image and the template.

If the first designated search point similarity (similarity s) does not exceed a detection threshold θ (object detection determination threshold θ) (NO in BLOCK 105), the similarity distribution creation module 3 changes the first designated search point (BLOCK 103). Then, the similarity distribution creation module 3 associates the template used to search the first learning image for an object with a second designated search point on the first learning image to have a second positional relationship, and detects a second designated search point similarity (similarity s) between the second designated search point on the first learning image and the template.

If the second designated search point similarity (similarity s) does not exceed the detection threshold θ (object detection determination threshold θ), the similarity distribution creation module 3 further changes the second designated search point and continues similarity detection. If the second designated search point similarity (similarity s) exceeds the detection threshold θ (object detection determination threshold θ), the similarity distribution creation module 3 determines that an object is detected in the second positional relationship.

As described above, if the similarity s exceeds the detection threshold θ (object detection determination threshold θ) (YES in BLOCK 105), the similarity distribution creation module 3 determines that an object is detected, and computes similarities near the detection position. The similarity distribution creation module 3 executes processing for adding a frequency f( ) associated with relative coordinates (xR, yR) from the object detection position and the similarity s for all relative coordinates and all search points (BLOCK 106 to BLOCK 110).

For example, when the first designated search point similarity (similarity s) exceeds the detection threshold θ (object detection determination threshold θ) in the first positional relationship, the similarity distribution creation module 3 detects surrounding search point similarities between a plurality of first surrounding search points around the first designated search point on the first learning image in the first positional relationship, and the template.

Upon completion of measurement of a similarity frequency for the first learning image with the above processing, the image input module 2 inputs a second learning image of the plurality of learning images, and the similarity distribution creation module 3 measures the aforementioned similarity frequency for the second learning image (BLOCK 101 to BLOCK 111). Subsequently, the similarity distribution creation module 3 similarly measures the aforementioned similarity frequencies for all learning images (BLOCK 101 to BLOCK 111).

Also, a plurality of types of templates may be prepared, and the similarity distribution creation module 3 may measure similarity frequencies using the respective templates. The plurality of types of templates are those used to detect, for example, different objects, and objects having different sizes.

The template will be supplemented. A template used to detect a face (object) means dictionary patterns of a subspace method, which respectively correspond to a face, eyes, and nose, as described in, for example, Jpn. Pat. Appln. KOKAI Publication No. 2003-346158. Alternatively, a template used to detect a face (object) is a model which expresses static features of each individual face of registered face images using sets of allocations of preset feature points and image feature amounts near these feature points, as described in, for example, Jpn. Pat. Appln. KOKAI Publication No. 2007-249394. Alternatively, a template used to detect a face (object) is a set of model data H including pieces of information (for example, Gabor wavelet coefficients) CA(x-) of images near feature points plotted on a registered face image, pieces of feature point allocation information x-, and person IDn, as described in, for example, Jpn. Pat. Appln. KOKAI Publication No. 2005-208850. Note that the template may be the aforementioned dictionary patterns or model data, or may be an image (template image).

Figure 3:
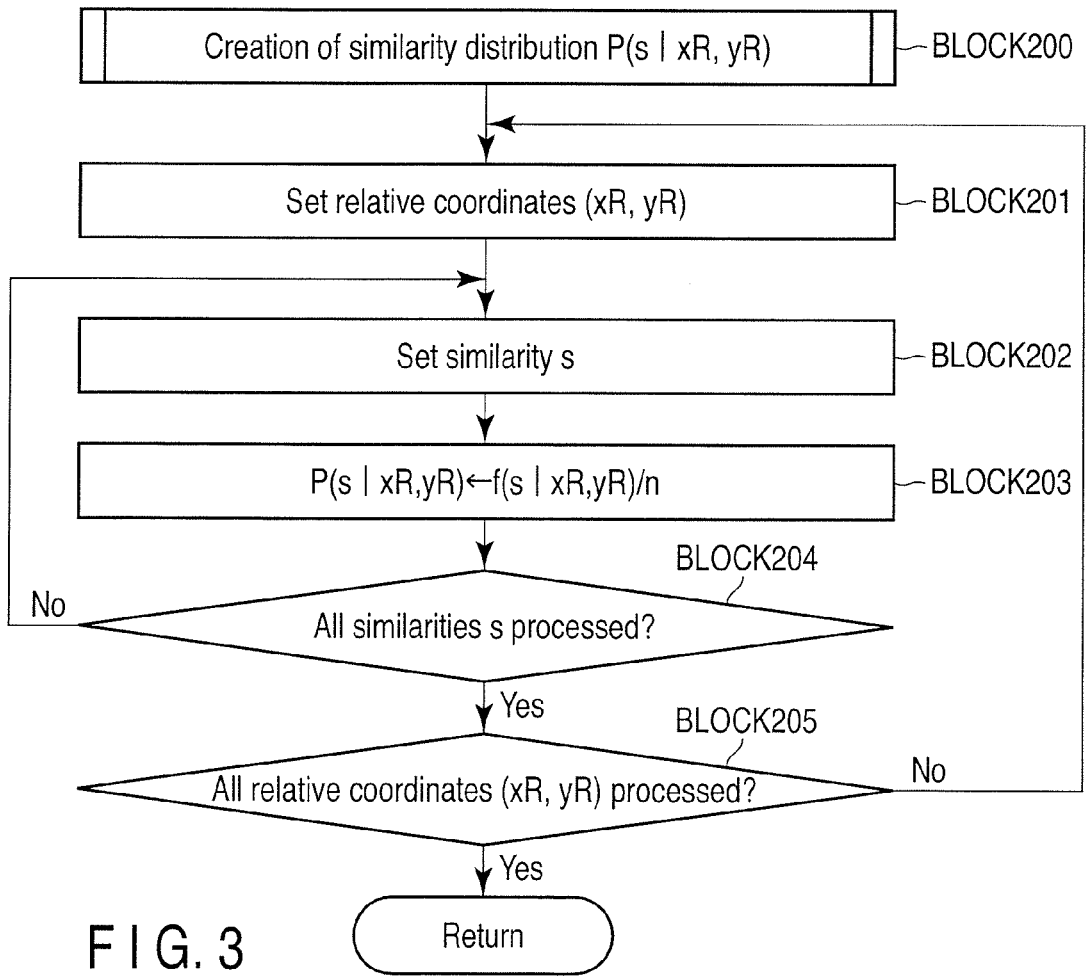
FIG. 3 is a flowchart showing an example of creation processing of a similarity distribution in FIG. 1.

An example of creation processing of a similarity distribution (BLOCK 200) in FIG. 1 will be described below with reference to the flowchart shown in FIG. 3.

Figure 9:
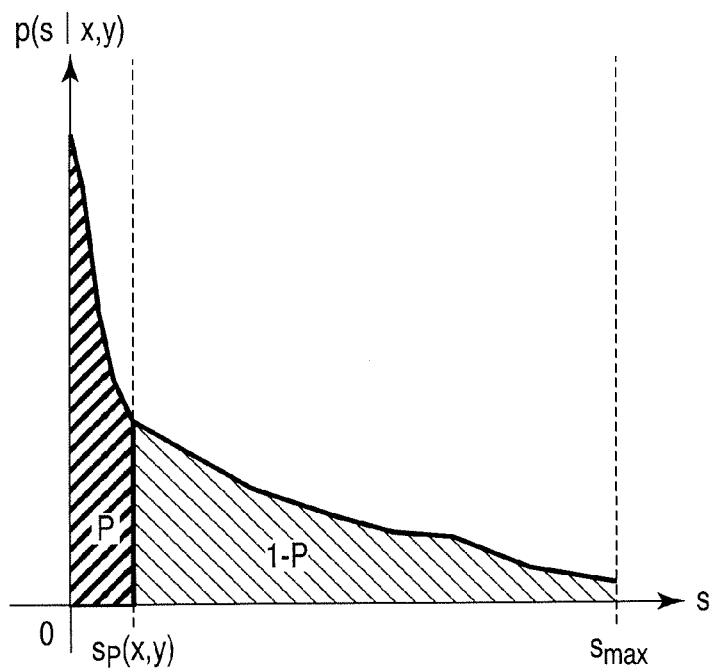
FIG. 9 is a graph showing an example of the concept of a similarity distribution (density) p(s|x, y) at positions separated away from an object detection position according to the embodiment.
Figure 10:
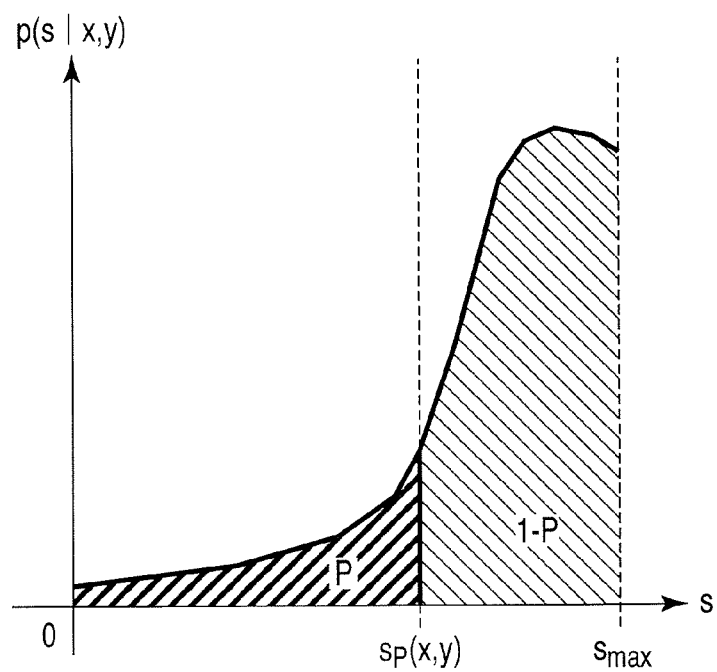
FIG. 10 is a graph showing an example of the concept of a similarity distribution (density) p(s|x, y) at positions close to the object detection position according to the embodiment.

The similarity distribution creation module 3 executes processing for computing P( ) by dividing the frequency f( ) computed in BLOCK 100 by the detection count n for all relative coordinates (BLOCK 201 to BLOCK 205). FIGS. 8, 9, and 10 are graphs showing examples of the concept of P(s|xR, yR). When positions are closer to an object position, a region having greater similarities s has a higher frequency, as shown in FIG. 10. When positions are farther away from an object position, a region having smaller similarities s has a higher frequency, as shown in FIG. 9.

Figure 4:
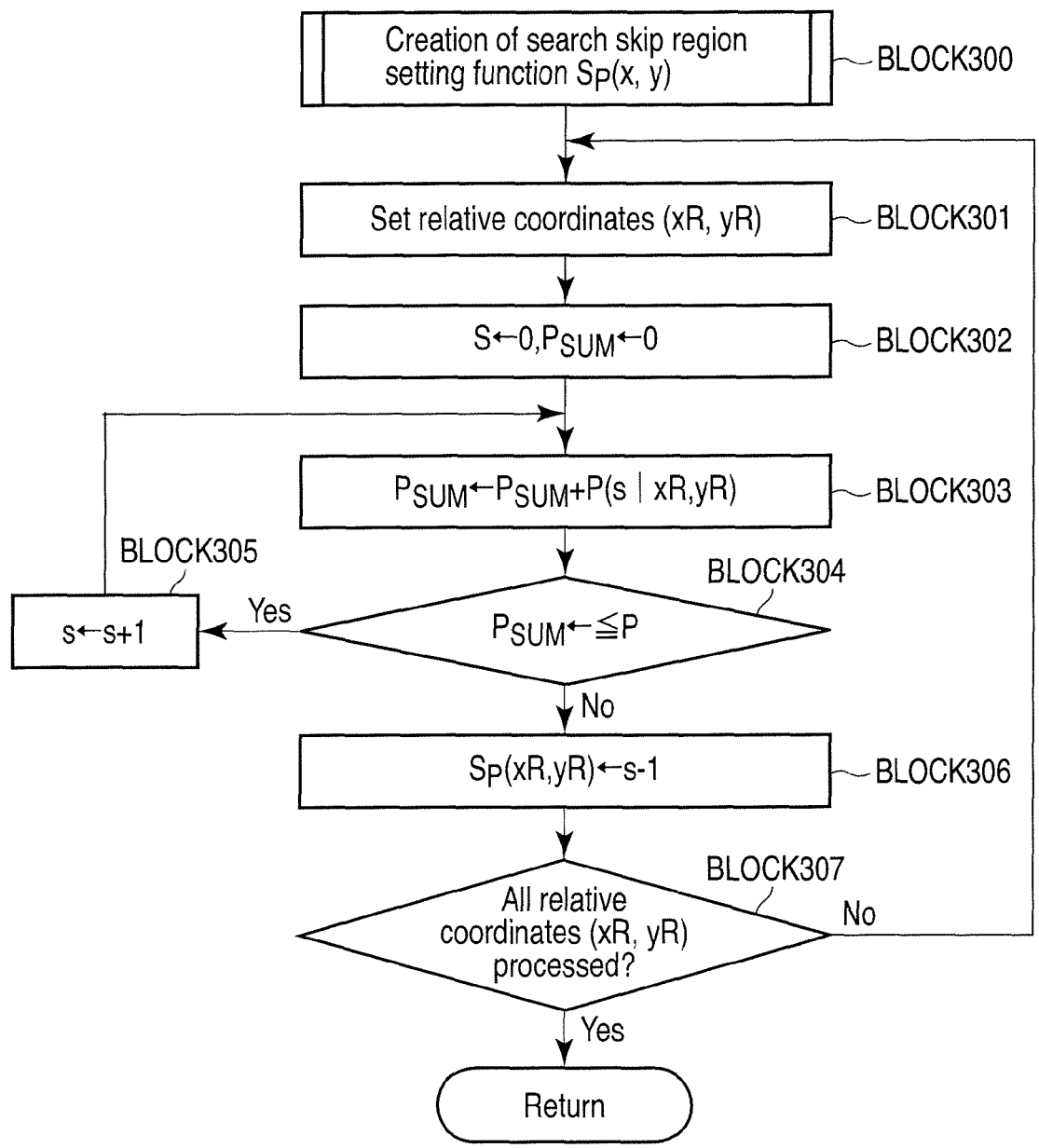
FIG. 4 is a flowchart showing an example of creation processing of a search skip region setting function in FIG. 1.

An example of creation processing of a search skip region setting function in FIG. 1 (BLOCK 300) will be described below with reference to the flowchart shown in FIG. 4.

The similarity distribution creation module 3 executes processing for cumulatively adding s from s=0 to s=P(s|x, y), and setting s immediately before a detection error ratio P (allowable detection error ratio P) is exceeded to be SP(x, y) for all relative coordinates (x, y) (BLOCK 301 to BLOCK 306), and the search skip region setting module 4 generates a search skip region setting function SP(x, y).

That is, the search skip region setting module 4 estimates distances between an object and a template based on the aforementioned surrounding search point similarity distribution, and generates a search skip region setting function used to set a search skip region based on the estimated distances. In this case, the distance means a relative position, and a criterion of the distance changes depending on directions. More specifically, the search skip region setting module 4 estimates object detection error ratios at the first surrounding search points based on the estimated distances (estimated relative positions), and generates the search skip region setting function based on the estimated detection error ratios. More specifically, the search skip region setting module 4 generates a search skip region setting function which compares the allowable detection error ratio that allows object detection errors and the estimated detection error ratios, and sets a region where the estimated detection error ratios are less than the allowable detection error ratio as a search skip region.

FIG. 11 is a graph showing an example of the concept of SP(x, y). When a detection error ratio P (allowable detection error ratio P) is small, a curve approaches the center, thus narrowing down a search skip region. Conversely, when the detection error ratio P (allowable detection error ratio P) is large, the curve is separated away from the center, thus broadening a search skip region. For example, when a sufficiently low possibility of object detection errors is to be set, the allowable detection error ratio P is set to be a vary small value (for example, 0%<P<5%), and a search skip region is narrowed down, thus setting a low possibility of object detection errors. When importance is attached to a reduction of an object search load rather than a lower possibility of object detection errors, the allowable detection error ratio P is set to be a relatively low value (for example, 5%≦P<10%), and a search skip region is broadened, thus reducing the object search load while preventing object detection errors.

FIG. 12 is a graph showing an example of the concept used to explain the search skip region setting function SP(x, y). FIG. 12 shows an example of lower limits of similarities at relative coordinates from an object detection position (0, 0) (to have the detection error ratio P). FIG. 12 shows a hill-like shape having the center as a top peak. When an object is detected at the object detection position (0, 0), a similarity at (x, y) is greater than or equal to SP(x, y) at a probability of 1−P.

FIG. 13 shows an example of a graph obtained by inverting FIG. 12 in association with x and y. When a similarity s is obtained at a certain position, letting (xR, yR) be relative coordinates from that position, an object detection probability in a region of SP(−xR, −yR)>s is less than or equal to the detection error ratio P (allowable detection error ratio P). Therefore, by setting the detection error ratio P (allowable detection error ratio P) to be a sufficiently small value, a search in this region is skipped to reduce a search computation volume.

The aforementioned mathematical definitions will be summarized below.

$S$: Similarity (1)

$P(s|x,y)$: Similarity distribution at relative coordinates $(x,y)$ (2)

$p(s|x,y)$: Similarity distribution (density) at relative coordinates $(x,y)$ (3)

$P$: Detection error ratio (4)

$s_P(x,y)$: Similarity threshold according to Detection error ratio $P$ (5)

$s \leq s_P(x,y)$: Search skip region (6)

$\int_0^s p(s|x,y)ds = 1$ (7)

$$\sum_{s=0}^{s_{max}} P(s \mid x, y) = 1 \quad (8)$$

$$\sum_{s=0}^{s_P(x,y)} P(s \mid x, y) = P < 1 \quad (9)$$

FIG. 14 is a graph showing an example of the concept of a search. A "+" mark in FIG. 14 indicates a search point. The search skip region setting module 4 sets search skip regions (hatched regions in FIG. 14) near the search points after search similarity computations.

For example, the image input module 2 inputs an object search target image (for example, a program image). The similarity distribution creation module 3 associates the object search target image with a template to have a predetermined positional relationship (to associate a first designated search point of the object search target image with the template), and detects a designated search point similarity between the first designated search point on the object search target image and the template. Furthermore, the similarity distribution creation module 3 detects surrounding search point similarities between a plurality of first surrounding search points around the first designated search point on the object search target image, and the template. Based on the detected designated search point similarity and surrounding search point similarities, when the similarities between the first designated search point and the plurality of surrounding search points on the object search target image, and the template are lower than a threshold θ (object non-detection determination threshold θ), the similarity distribution creation module 3 determines that no object exists near (in the predetermined region of) the first designated search point on the object search target image at a high possibility, and the search skip region setting module 4 sets a search skip region based on the search skip region setting function with reference to the first designated search point.

Figure 15:
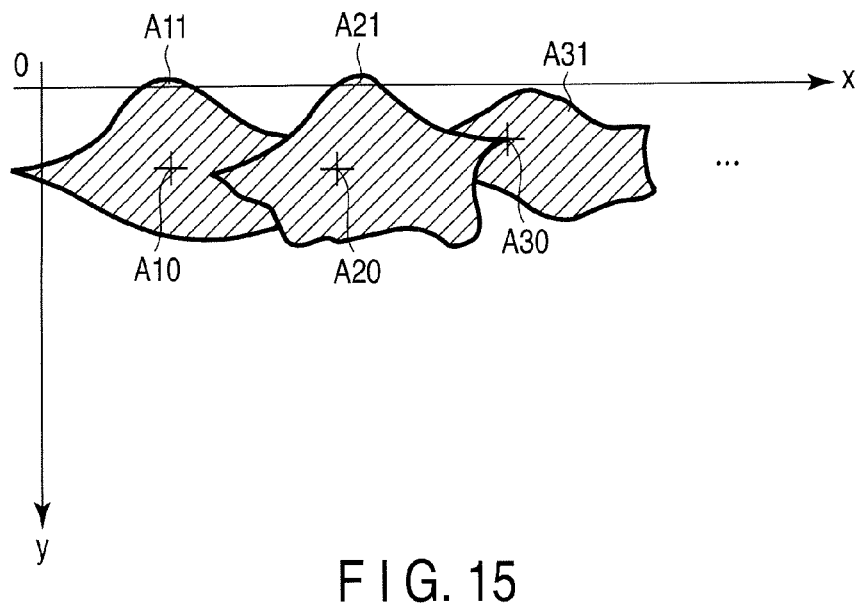
FIG. 15 is a graph showing an example of a setting order of search skip regions on an object search target image according to the embodiment.

Since a search skip region corresponding to one search point depends on similarities, allocations of search points have to be dynamically set. For example, as shown in FIG. 15, when similarities between a first designated search point A10 and a plurality of surrounding search points on an object search target image, and a template do not exceed the threshold θ (object non-detection determination threshold θ), the search skip region setting module 4 sets a first search skip region A11 based on the search skip region setting function with reference to the first designated search point A10. Next, when similarities between a second designated search point A20 (which falls outside the first search skip region A11 and is adjacent to the first search skip region A11) and a plurality of surrounding search points, and the template do not exceed the threshold θ (object non-detection determination threshold θ), the search skip region setting module 4 sets a second search skip region A21 based on the search skip region setting function with reference to the second designated search point A20. Next, when similarities between a third designated search point A30 (which falls outside the first search skip region A11 and the second search skip region A21, is farthest from the first search skip region A11, and is adjacent to the second search skip region A21) and a plurality of surrounding search points, and the template do not exceed the threshold θ (object non-detection determination threshold θ), the search skip region setting module 4 sets a third search skip region A31 based on the search skip region setting function with reference to the third designated search point A30. In this manner, the search skip region setting module 4 can set one or more search skip regions on the object search target image.

Figure 16:
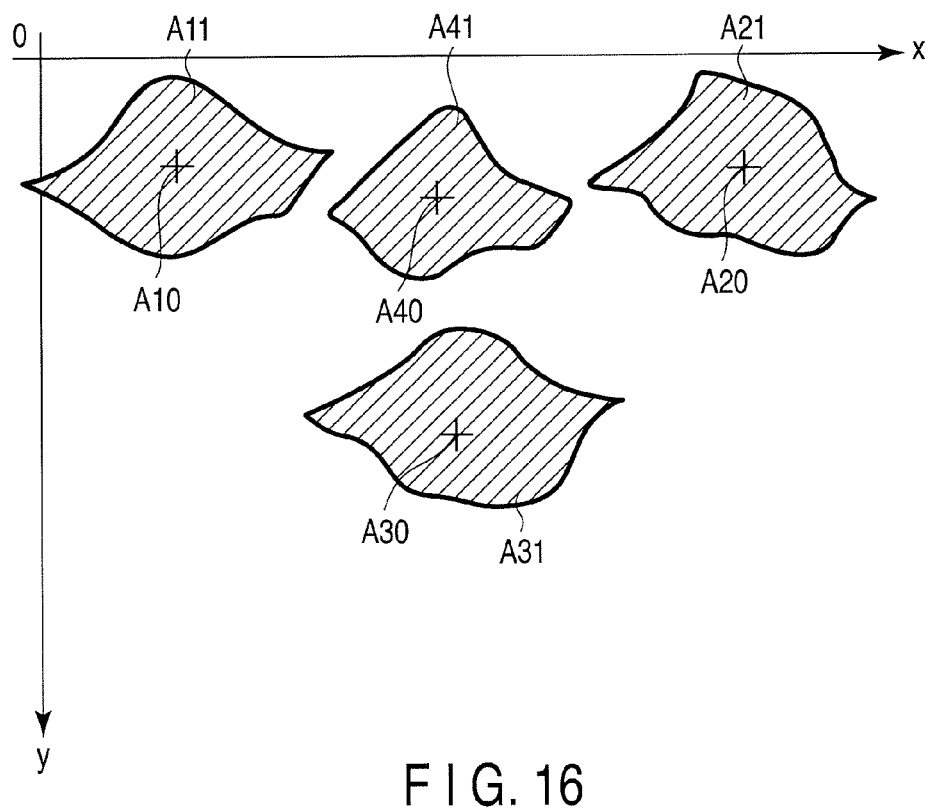
FIG. 16 is a graph showing an example of a setting order of search skip regions on an object search target image according to the embodiment.

Alternatively, as shown in FIG. 16, when similarities between a first designated search point A10 and a plurality of surrounding search points on an object search target image, and a template do not exceed the threshold θ (object non-detection determination threshold θ), the search skip region setting module 4 sets a first search skip region A11 based on the search skip region setting function with reference to the first designated search point A10. Next, when similarities between a second designated search point A20 (which falls outside the first search skip region A11 and is separated from the first search skip region A11 by a predetermined distance or more) and a plurality of surrounding search points, and the template do not exceed the threshold θ (object non-detection determination threshold θ), the search skip region setting module 4 sets a second search skip region A21 based on the search skip region setting function with reference to the second designated search point A20. Next, when similarities between a third designated search point A30 (which falls outside the first search skip region A11 and the second search skip region A21, and is separated from the first search skip region A11 and the second search skip region A21 by a predetermined distance or more) and a plurality of surrounding search points, and the template do not exceed the threshold θ (object non-detection determination threshold θ), the search skip region setting module 4 sets a third search skip region A31 based on the search skip region setting function with reference to the third designated search point A30. In this manner, the search skip region setting module 4 can set one or more search skip regions on the object search target image as a first stage. Furthermore, when similarities between a fourth designated search point A40 (which falls outside the first search skip region A11, the second search skip region A21, and the third search skip region A31, and is, for example, farthest from these regions) and a plurality of surrounding search points, and the template do not exceed the threshold θ (object non-detection determination threshold θ), the search skip region setting module 4 sets a fourth search skip region A41 based on the search skip region setting function with reference to the fourth designated search point A40. In this manner, the search skip region setting module 4 can set one or more search skip regions on the object search target image as a second stage. By repeating the aforementioned processing, the search skip region setting module 4 can efficiently set a plurality of search skip regions on the object search target image.

As described above, the search skip region setting module 4 sets a plurality of search skip regions to cover the object search target image. Subsequently, the search module 5 conducts an object search for an exclusion region obtained by excluding the search skip regions from an object search target image region. That is, the search module 5 overlays and scans a template on the exclusion region obtained by excluding the search skip regions from the object search target image region, thus searching for an object. In this manner, an object search can be conducted more efficiently than a case in which an object search is conducted by shifting a template pixel by pixel for the entire object search target image region.

According to the object search skip region setting method of this embodiment, object search processing can be speeded up while suppressing object detection errors.

Figure 17:
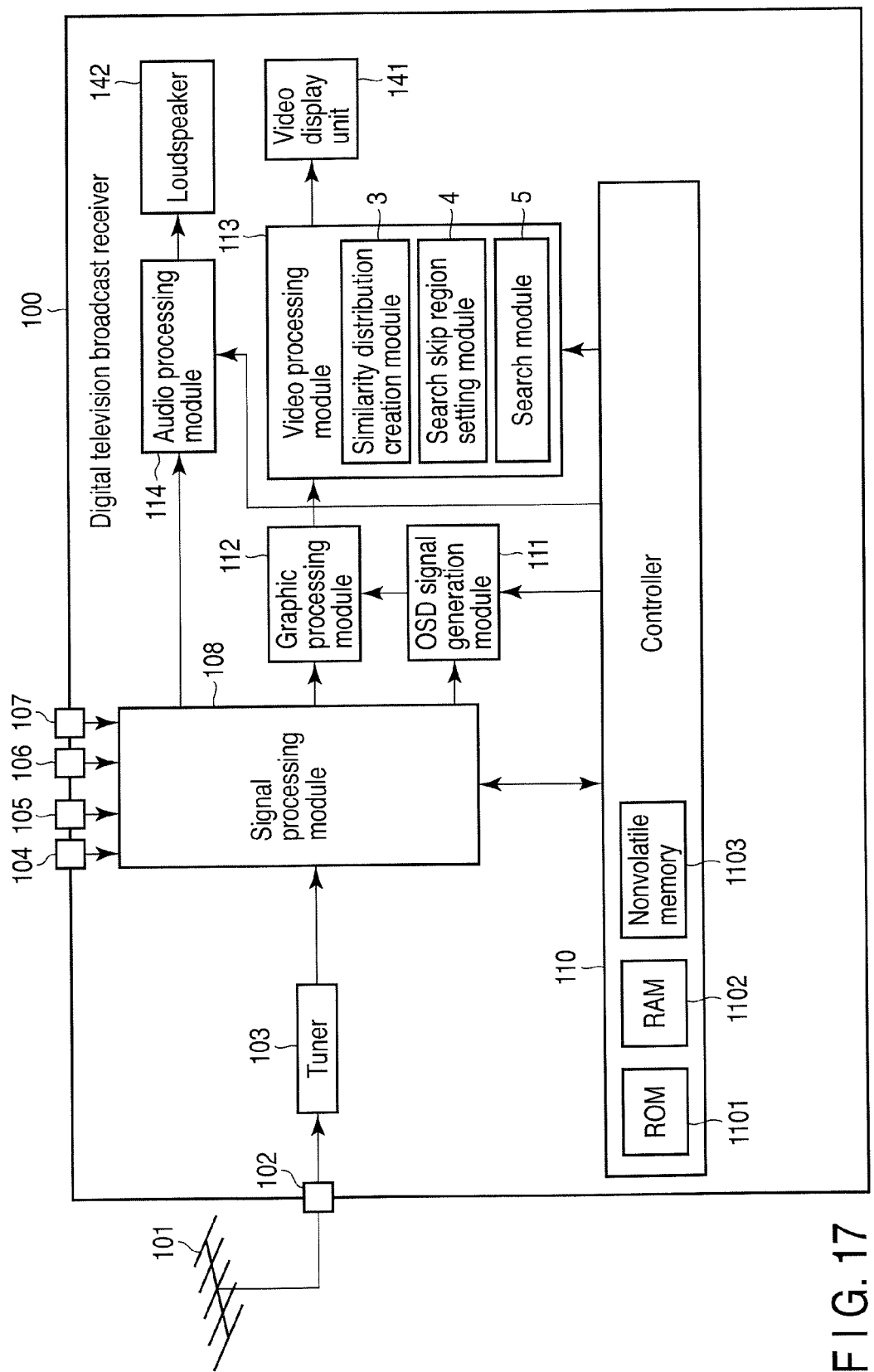
FIG. 17 is a block diagram showing an example of a digital television broadcast receiver to which an object search skip region setting method and object search skip region setting apparatus according to the embodiment are applied.

An application example of the object search skip region setting method and object search skip region setting apparatus according to this embodiment will be described below. FIG. 17 is a schematic block diagram showing an example of the arrangement of a digital television broadcast receiver to which the object search skip region setting method and object search skip region setting apparatus according to this embodiment are applied.

The basic arrangement of a digital television broadcast receiver 100 will be briefly described below. As shown in FIG. 17, the digital television broadcast receiver 100 includes an input terminal 102, a tuner unit 103, external input terminals 104 to 107, a signal processing module 108, a controller 110, an OSD signal generation module 111, a graphic processing module 112, a video processing module 113, and an audio processing module 114.

A terrestrial digital television broadcast signal received by a terrestrial broadcast receiving antenna 101 is supplied to the tuner unit 103 via the input terminal 102. The tuner unit 103 tunes a signal of a designated channel from the broadcast signal, and outputs that signal to the signal processing module 108. The signal processing module 108 separates video and audio signals from the tuned signal of the designated channel, outputs the video signal to the graphic processing module 112, and outputs the audio signal to the audio processing module 114.

The graphic processing module 112 superimposes an on-screen display (OSD) signal generated by the OSD signal generation module 111 on the video signal, as needed, and outputs that video signal. The graphic processing module 112 can also selectively output the video signal from the signal processing module 108 and the OSD signal from the OSD signal generation module 111.

The video signal output from the graphic processing module 112 is supplied to the video processing module 113. The video signal processed by the video processing module 113 is supplied to a video display unit 141. The video display unit 141 displays an image based on the video signal. The audio processing module 114 converts the audio signal into an analog audio signal that can be output from a loudspeaker 142, and outputs the converted signal to the loudspeaker 142.

The digital television broadcast receiver 100 is systematically controlled by the controller 110. The controller 110 is configured by, for example a central processing unit (CPU), which controls the operations of the respective modules upon reception of signals (various instructions) from, for example, a remote controller. Also, the controller 110 includes a read-only memory (ROM) 1101 which stores control programs to be executed by the CPU, a random access memory (RAM)

1102 which provides work areas to the CPU, and a nonvolatile memory 1103 which stores, for example, various kinds of setting and control information.

For example, the aforementioned video processing module 113 includes the similarity distribution creation module 3, search skip region setting module 4, and search module 5 shown in FIG. 5. The search skip region setting module 4 sets search skip regions on an input image (program image) based on the search skip region setting function. The search module 5 conducts an object search for an exclusion region obtained by excluding the search skip regions from an input image region, and can detect an object from the input image.

The significance of detection of an object from an input image will be briefly explained below. The video processing module 113 has a function of converting, for example, a two-dimensional (2D) image into a three-dimensional (3D) image (2D/3D conversion). For example, in the 2D/3D conversion processing, a 2D image is analyzed to detect each object such as a person in the 2D image and to detect an anteroposterior relation (depth) of that object. The object is deformed as needed to generate a 3D image. The aforementioned object detection can be applied to such 2D/3D conversion processing.

The video processing module 113 has an image quality enhancement function which enhances the image quality of an input image. For example, the image quality enhancement processing includes super-resolution processing. Super-resolution processing converts a low-resolution (first-resolution) image signal to a high-resolution (second-resolution) image signal by estimating new pixel values on the basis of the first-resolution image signal in order to increase the number of pixels. With such super-resolution processing, for example, an object is detected, and a super-resolution processing effect may be emphasized or de-emphasized depending on the type of object. The aforementioned object detection can be applied to such image quality enhancement processing.

Note that object detection is not limited to applications to the aforementioned 2D/3D conversion processing and image quality enhancement processing, but can be applied to various kinds of image processing that require object detection. That is, the aforementioned object search skip region setting method can be applied to the aforementioned 2D/3D conversion processing and image quality enhancement processing, and can also be applied to various kinds of image processing.

According to at least one embodiment described above, the search skip region setting function generation method, search skip region setting method, object search method, search skip region setting function generation apparatus, search skip region setting apparatus, and object search apparatus, which can improve the object search efficiency, can be provided.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A search skip region setting function generation method comprising:
    associating a template used to search a model image for an object with a designated search point on the model image, and detecting a designated search point similarity between the designated search point and the template;
    changing the designated search point when the designated search point similarity does not exceed an object detection determination threshold, and detecting surrounding search point similarities between a plurality of surrounding search points around the designated search point on the model image and the template when the designated search point similarity exceeds the object detection determination threshold; and
    estimating a distance between the object and the template based on a high-low frequency of the surrounding search point similarities, estimating a detection error ratio of the object at a first surrounding search point based on the estimated distance, comparing an allowable detection error ratio that allows a detection error of the object with the estimated detection error ratio, and generating a function required to set a region where the estimated detection error ratio are less than the allowable detection error ratio as the search skip region of the object.

2. The method of claim 1, wherein the generating comprises generating the function required to set a first search skip region of a first size based on a first estimated distance, and to set a second search skip region of a second size greater than the first size based on a second estimated distance longer than the first estimated distance.

3. The method of claim 1, wherein the generating comprises generating the function required to set a first search skip region of a first size based on first estimated detection error ratios, and to set a second search skip region of a second size greater than the first size based on second estimated detection error ratios lower than the first estimated detection error ratios.

4. A search skip region setting method comprising:
    setting the search skip region based on the function generated by a search skip region setting function generation method of claim 1.

5. An object search method comprising:
    searching, for the object, an exclusion region obtained by excluding the search skip region, which is set on an object search target image by a search skip region setting method of claim 4, from the object search target image.

6. The method of claim 5, wherein the searching comprises associating a reference point of the object search target image with a reference point of the template, setting, when a similarity between a predetermined region including the reference point of the object search target image and the template is lower than a threshold, the search skip region based on the reference point of the object search target image, and searching an exclusion region obtained by excluding the search skip region from the object search target image for the object.

7. A search skip region setting function generation apparatus comprising:
    a first detector configured to associate a template used to search a model image for an object with a designated search point on the model image, and to detect a designated search point similarity between the designated search point and the template;

a second detector configured to change the designated search point when the designated search point similarity does not exceed an object detection determination threshold, and to detect surrounding search point similarities between a plurality of surrounding search points around the designated search point on the model image and the template when the designated search point similarity exceeds an object detection determination threshold; and a generator configured to estimate a distance between the object and the template based on a high-low frequency of the surrounding search point similarities, to estimate a detection error ratio of the object at a first surrounding search point based on the estimated distance, to compare an allowable detection error ratio that allows a detection error of the object with the estimated detection error ratio, and to generate a function required to set a region where the estimated detection error ratio are less than the allowable detection error ratio as the search skip region of the object.

8. A search skip region setting apparatus comprising:
a setting module configured to set the search skip region based on the function generated by a search skip region setting function generation apparatus of claim 7.

9. An object search apparatus comprising:
a search module configured to search, for the object, an exclusion region obtained by excluding the search skip region, which is set on an object search target image by a search skip region setting apparatus of claim 8, from the object search target image.

10. The apparatus of claim 9, wherein the search module is configured to associate a reference point of the object search target image with a reference point of the template, to set, when a similarity between a predetermined region including the reference point of the object search target image and the template is lower than a threshold, the search skip region based on the reference point of the object search target image, and to search an exclusion region obtained by excluding the search skip region from the object search target image for the object.

* * * * *